(12) United States Patent
Hardy et al.

(10) Patent No.: US 12,554,431 B2
(45) Date of Patent: Feb. 17, 2026

(54) DATA MIGRATION BETWEEN COMPRESSED AND NON-COMPRESSED RANKS

(71) Applicant: INTERNATIONAL BUSINESS MACHINES CORPORATION, Armonk, NY (US)

(72) Inventors: Clint A. Hardy, Tucson, AZ (US); Matthew G. Borlick, Tucson, AZ (US); Beth Ann Peterson, Tucson, AZ (US); Lokesh Mohan Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 18/421,727

(22) Filed: Jan. 24, 2024

(65) Prior Publication Data
US 2025/0238159 A1    Jul. 24, 2025

(51) Int. Cl.
*G06F 3/06*    (2006.01)

(52) U.S. Cl.
CPC .......... *G06F 3/0653* (2013.01); *G06F 3/0604* (2013.01); *G06F 3/0683* (2013.01)

(58) Field of Classification Search
CPC .... G06F 3/0653; G06F 3/0604; G06F 3/0683; G06F 3/0638
See application file for complete search history.

(56) References Cited

U.S. PATENT DOCUMENTS

| | | | |
|---|---|---|---|
| 5,237,460 A | 8/1993 | Miller et al. | |
| 5,237,675 A | 8/1993 | Hannon, Jr. | |
| 6,360,300 B1 | 3/2002 | Corcoran et al. | |
| 6,678,813 B1 | 1/2004 | Le | |
| 9,565,401 B1* | 2/2017 | Graybill | H04N 19/12 |
| 9,766,816 B2 | 9/2017 | Kowles | |
| 2009/0254914 A1* | 10/2009 | Sundaresan | G06F 9/505 718/103 |
| 2011/0138148 A1 | 6/2011 | Friedman et al. | |
| 2017/0039000 A1* | 2/2017 | Feng | G06F 3/0638 |
| 2017/0212698 A1* | 7/2017 | Bhadauria | G06F 12/0888 |
| 2020/0104055 A1* | 4/2020 | Matsugami | G06F 3/0659 |
| 2020/0142587 A1* | 5/2020 | Gong | G06F 3/0619 |

FOREIGN PATENT DOCUMENTS

JP    2020098540 A    * 6/2020

OTHER PUBLICATIONS

M. Abdelaal, et al., "Improving Energy Efficiency in QoS-Constrained Wireless Sensor Networks," Hindawi Publishing Corporation, International Journal of Distributed Sensor Networks, vol. 2016, Article ID 1576038, Oct. 5, 2015, 28 pp.
M. Poess, et al., "Data Compression in Oracle," Proceedings of the 29th VLDB Conference, Berlin, Germany, 2003, 11 pp.

* cited by examiner

*Primary Examiner* — Jared I Rutz
(74) *Attorney, Agent, or Firm* — KONRAD, RAYNES, DAVDA & VICTOR LLP; Rabindranath Dutta (57) ABSTRACT

A score is generated for each extent in a storage device based on a plurality of factors including storage capacities, expected compression ratios, and statistics on reads and writes. An extent is moved between a compressed rank and a non-compressed rank based on the generated score.

14 Claims, 9 Drawing Sheets

DATA MIGRATION BETWEEN COMPRESSED AND NON-COMPRESSED RANKS

BACKGROUND

Embodiments relate to a method, system, and computer program product for data migration between compressed and non-compressed ranks.

A storage controller may manage storage devices and allow a host computational device to access logical storage volumes that are logical representations of physical storage volumes maintained in the storage devices.

Storage devices managed by the storage controller may include hard disk drives, solid state drives (SSD) and other storage devices. Data stored in storage devices may be compressed data or uncompressed data. While compression of data may need additional processing cycles during compression, the compression of data may be advantageous in certain situations.

The storage devices may be configured as a Redundant Array of Independent Disks (RAID). Compressed ranks and non-compressed ranks may be maintained by the storage controller in the RAID configuration. Some extents of a plurality of extents managed by the storage controller are stored in compressed ranks and other extents in non-compressed ranks.

SUMMARY

Provided are a method, system, and computer program product in which a score is generated for each extent in a storage device based on a plurality of factors including storage capacities, expected compression ratios, and statistics on reads and writes. An extent is moved between a compressed rank and a non-compressed rank based on the generated score.

In additional embodiments, the plurality of factors for generating the score comprise: storage capacity remaining in compressed ranks; storage capacity remaining in non-compressed ranks; an expected compression ratio for data in the extent; and a number of reads and writes in a predetermined time interval.

In further embodiments, in response to determining that the score is over a predetermined threshold and the extent is on a compressed rank, the extent is moved to a non-compressed rank.

In yet further embodiments, in response to determining that the score is at or below a predetermined threshold and the extent is on a non-compressed rank, the extent is moved to a compressed rank.

In certain embodiments, if a free storage capacity in a compressed rank is below a predetermined percentage then the score is increased, and if a free storage capacity in a non-compressed rank is below a predetermined percentage then the score is decreased.

In additional embodiments, extents are sorted based on the score and those extents with lowest and highest scores are migrated before extents with scores that fall in between the lowest and the highest scores.

In further embodiments, if a number of writes in a previous time interval is over a threshold then the score is decreased, wherein if a number of reads in the previous time interval is over the threshold then the score is increased.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized, and structural and operational changes may be made.

In-drive SSD compression may increase over-provisioning capacity, reduce write amplification, and extend endurance. (i.e., how long the SSD lasts under warranty before wearing out). The impact on read and write latencies is unquantified but low. However, less data after compression means that the SSD writes less and therefore write performance improves.

As a result, it may be preferable to store highly compressible data on compressed SSD drives. However, data that has low compression should preferably be stored on non-compressed drives. Data that has been written frequently should be stored on compressed drives but data that is being read frequently should be on non-compressed drives due to impact on read latency.

There are several factors to consider while determining when to store data on compressed drives and when to store data on non-compressed drives based on characteristics of the data.

In a situation where the data is encrypted, since encrypted data does not compress well the encrypted data should be stored on non-compressed drives.

In a situation where the data has low compression ratio, the data should be stored on non-compressed drives.

In a situation in which compressed drives are out of spare capacity, selected data should be migrated out of compressed drives to non-compressed drives.

In a situation in which data has a high access rate for reads but very low amounts of writes, the data should be on non-compressed drives to reduce read latency.

In a situation in which data has high amounts of writes but low amounts of reads, the data should be on compressed drives.

Certain embodiments provide mechanisms to create a score for each extent in storage based on:
a) Storage Capacity remaining in compressed ranks;
b) Storage Capacity remaining in non-compressed ranks;
c) Expected compression ratio for the data in the extent; and
d) Number of reads and writes in a last interval (e.g., in the last 24 hours).

In certain embodiments, based on the score, extents are moved between compressed and non-compressed ranks. As a result, improvements are made to a computational device that manages storage devices and the storage devices are used more efficiently in comparison to mechanisms in which extents are not moved between compressed and non-compressed ranks.

Figure 1:
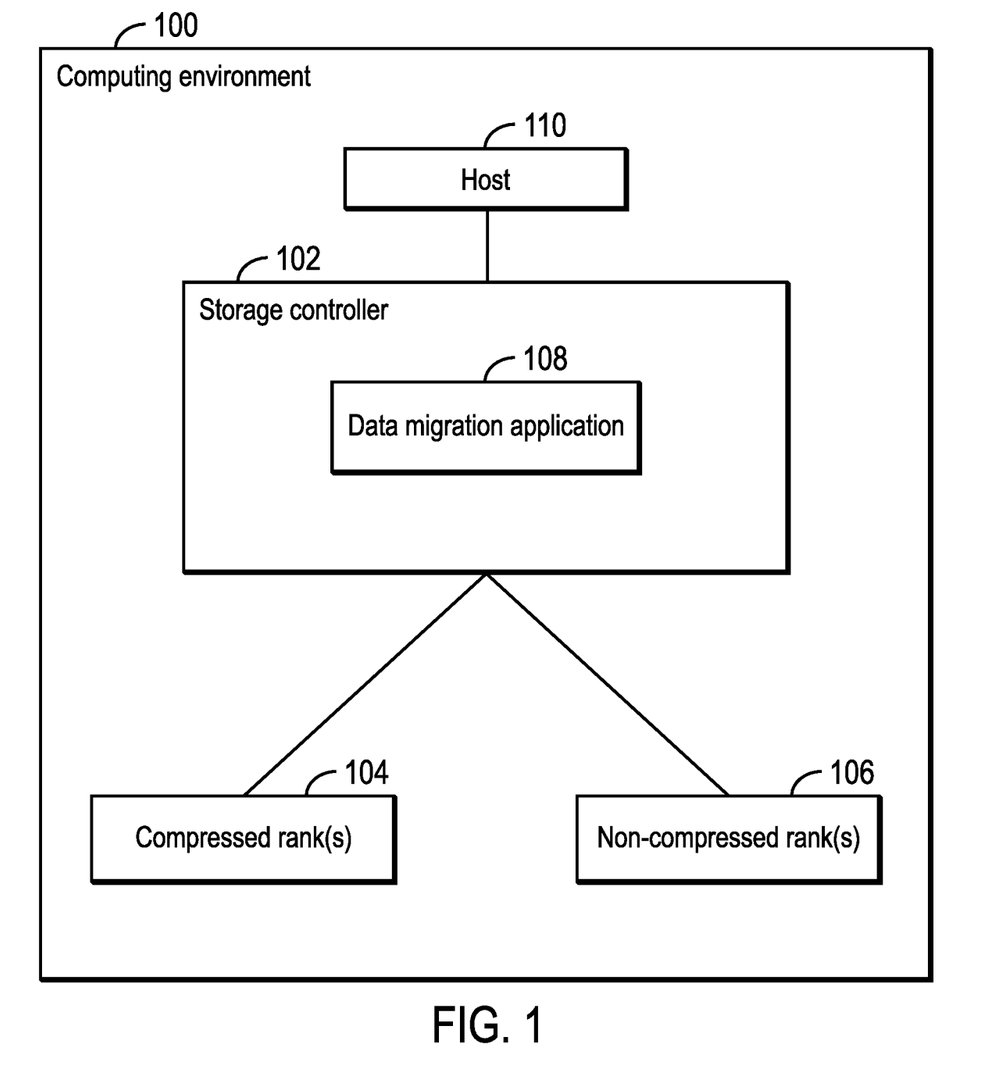
FIG. 1 illustrates a block diagram of a computing environment, in accordance with certain embodiments.

FIG. 1 illustrates a block diagram of a computing environment 100, in accordance with certain embodiments.

The computing environment 100 includes a storage controller 102 that configures a plurality of storage devices including at least hard disk drives and SSDs into RAID ranks that include one or more compressed ranks and one or more non-compressed ranks 106. A data migration application 108 may move extents between compressed ranks and non-compressed ranks to improve the performance of the storage controller 102.

The storage controller 102 may allow the host 110 to access logical volumes whose physical volumes are maintained in storage devices managed by the storage controller 102.

The host 110 and the storage controller 102 may in certain embodiments comprise any suitable computational device known in the art such as a server, a personal computer, a laptop, a telephony device, s mainframe, etc. The storage devices managed by the storage controller 102 may include SSDs, hard disk drives, tape drives, etc.

Certain embodiments provide a mechanism for the storage controller 102 to migrate data between compressed ranks 104 and non-compressed ranks 106 to improve the performance of storage access in the computing environment 100.

Figure 2:
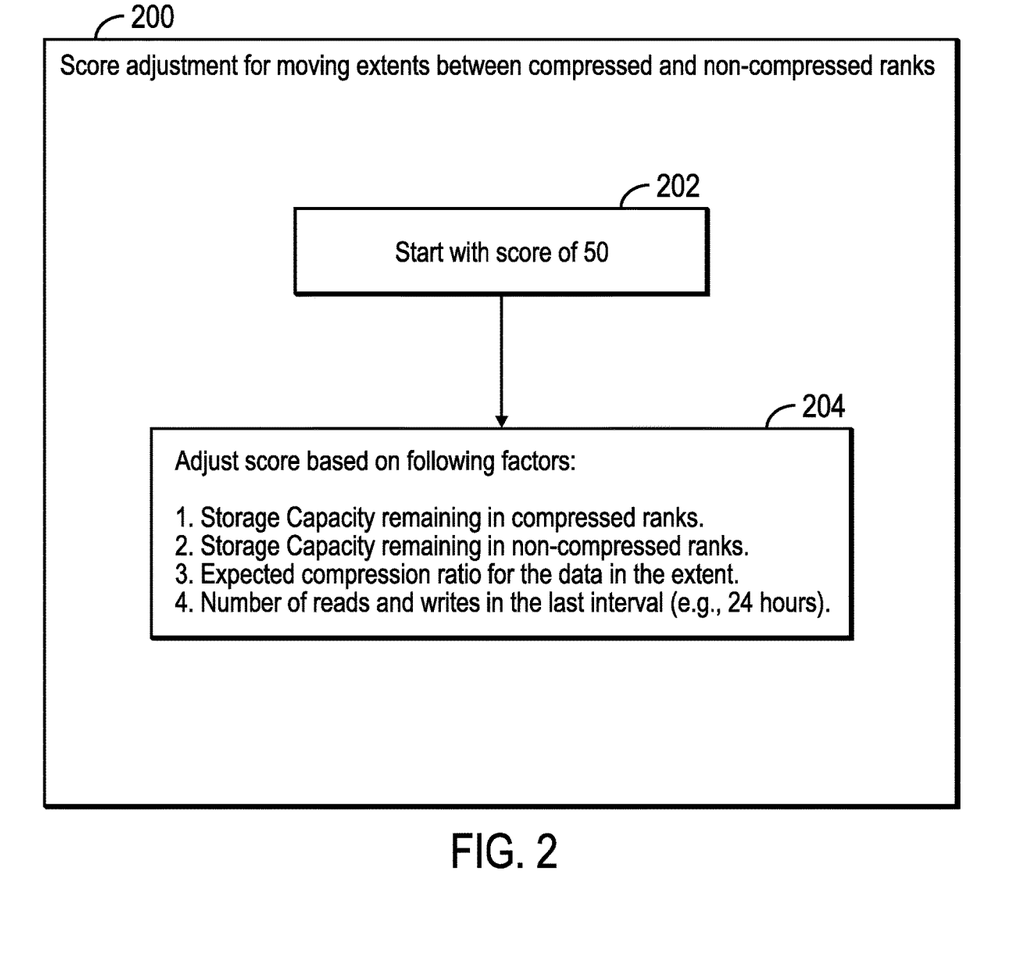
FIG. 2 illustrates a flowchart that shows score adjustment for moving extents between compressed and non-compressed ranks, in accordance with certain embodiments.

FIG. 2 illustrates a flowchart 200 that shows score adjustment for moving extents between compressed and non-compressed ranks, in accordance with certain embodiments. The migration of data is based on computation of scores based on various factors.

Control starts at block 202 where the score is initially set to a predetermined number, and for purposes of illustration the predetermined number has been set to 50 at the beginning. So, at block 202 the process starts with the score set to 50.

From block 202 control proceeds to block 204 in which the score is adjusted based on the following factors:
1. Storage Capacity remaining in compressed ranks.
2. Storage Capacity remaining in non-compressed ranks.
3. Expected compression ratio for the data in the extent.
4. Number of reads and writes in the last interval (e.g., 24 hours).

Figure 3:
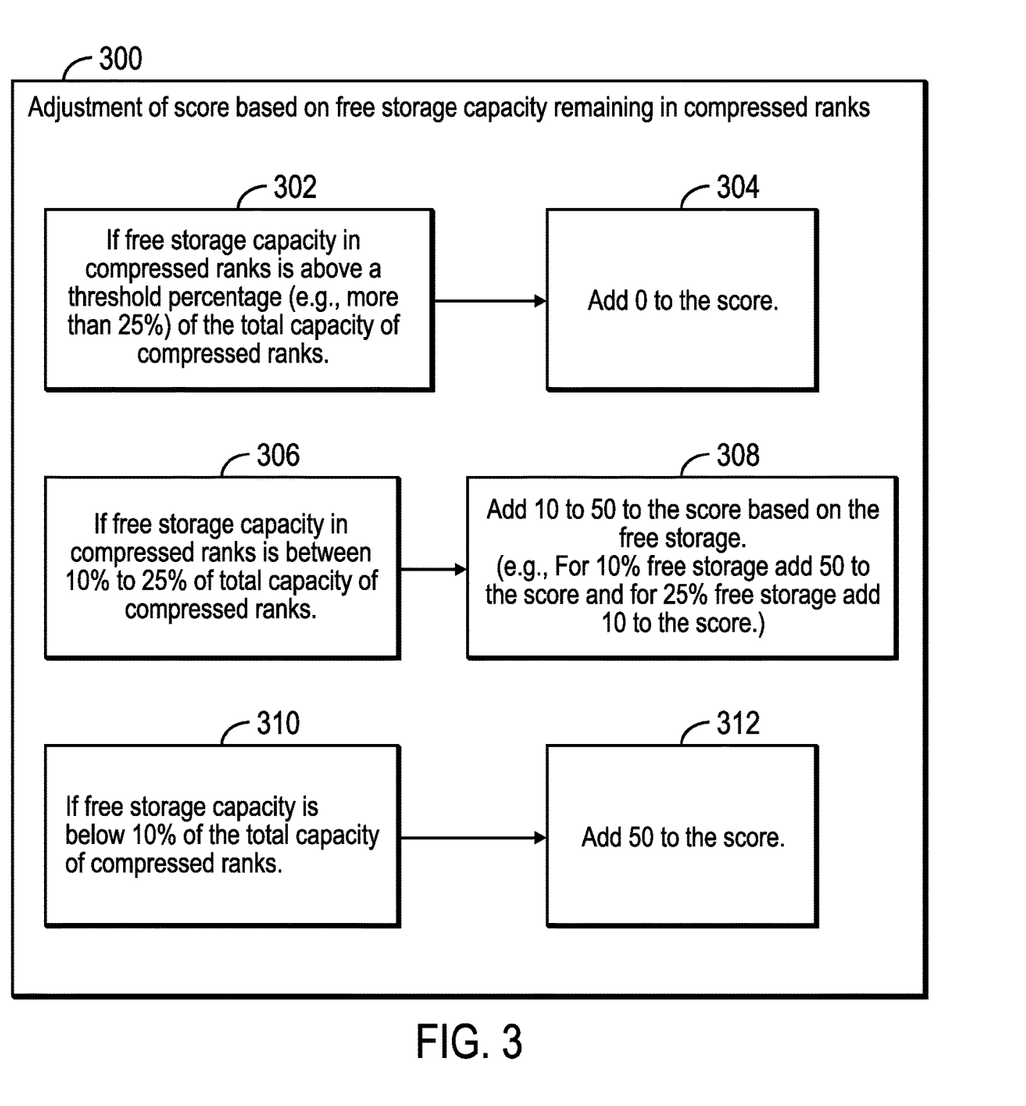
FIG. 3 illustrates a block diagram that shows adjustment of score based on free storage capacity remaining in compressed ranks, in accordance with certain embodiments.

FIG. 3 illustrates a block diagram 300 that shows adjustment of score based on free storage capacity remaining in compressed ranks, in accordance with certain embodiments.

If free storage capacity in compressed ranks is above a threshold percentage (e.g., more than 25%) of the total capacity of compressed ranks (as shown via reference numeral 302) then in certain embodiments 0 is added to the score (as shown via reference numeral 304).

If free storage capacity in compressed ranks is between 10% to 25% of total capacity of compressed ranks (as shown via reference numeral 306) then 10 to 50 is added to the score based on the amount of free storage left (as shown via reference numeral 308). For example, for 10% free storage the process may add 50 to the score and for 25% free storage the process may add 10 to the score.

If free storage capacity is below 10% of the total capacity of compressed ranks (as shown via reference numeral 310), then 50 is added to the score (as shown via reference numeral 312).

It should be noted that numbers such as 10, 50, 10%, 25%, etc., that have been used in FIG. 3 may be different in other embodiments.

Figure 4:
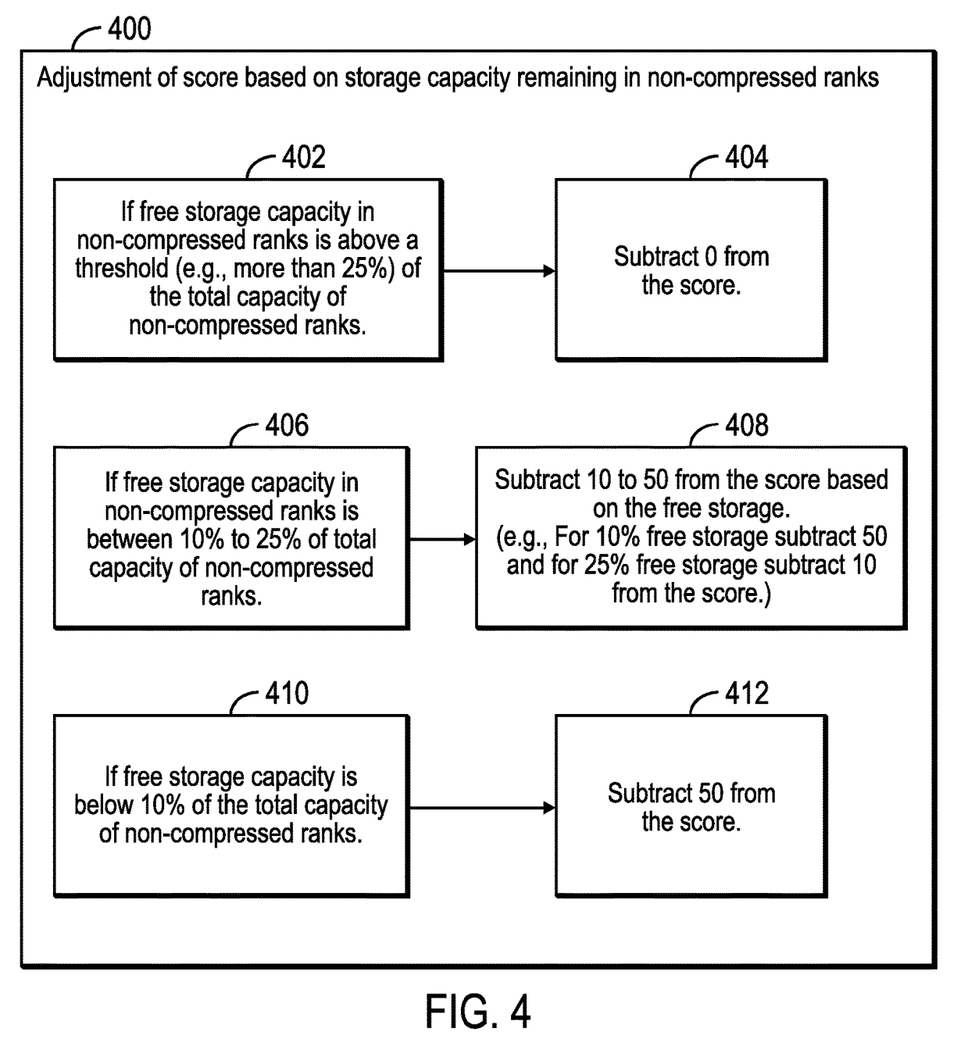
FIG. 4 illustrates a block diagram that shows adjustment of score based on free storage capacity remaining in non-compressed ranks, in accordance with certain embodiments.

FIG. 4 illustrates a block diagram 400 that shows adjustment of score based on free storage capacity remaining in non-compressed ranks, in accordance with certain embodiments.

If free storage capacity in non-compressed ranks is above a threshold (e.g., more than 25%) of the total capacity of non-compressed ranks (as shown via reference numeral 402) then 0 is subtracted from the score (as shown via reference numeral 404).

If free storage capacity in non-compressed ranks is between 10% to 25% of total capacity of non-compressed ranks (as shown via reference numeral 406) then 10 to 50 is subtracted from the scored based on the amount of free storage (as shown via reference numeral 408). For example, for 10% free storage the process may subtract 50 and for 25% free storage the process may subtract 10 from the score.

If free storage capacity is below 10% of the total capacity of non-compressed ranks (shown via reference numeral 410) then 50 is subtracted from the score (at reference numeral 412).

It should be noted that numbers such as 10, 50, 10%, 25%, etc., that have been used in FIG. 4 may be different in other embodiments.

Figure 5:
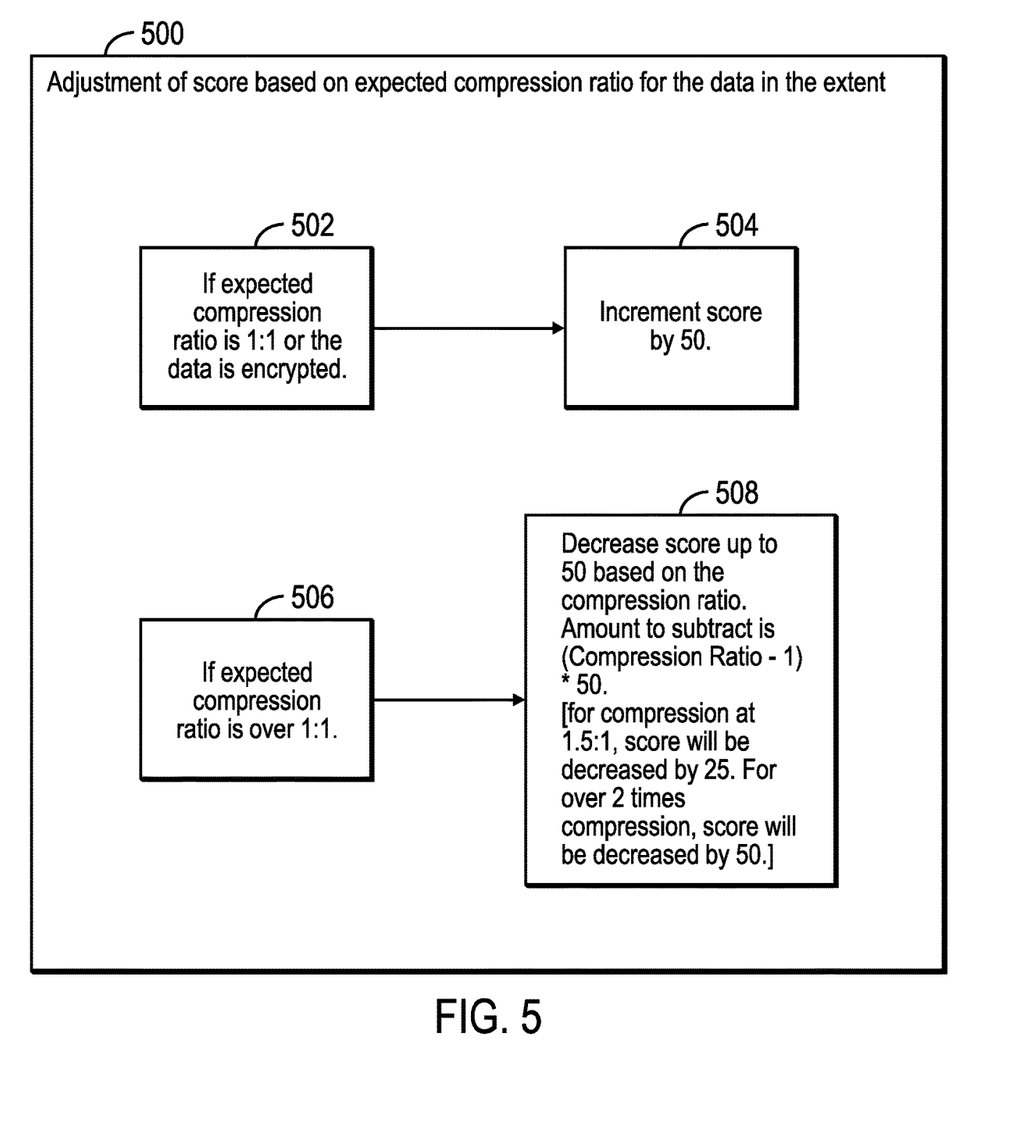
FIG. 5 illustrates a block diagram that shows adjustment of score based on expected compression ratio for the data in the extent, in accordance with certain embodiments.

FIG. 5 illustrates a block diagram 500 that shows adjustment of score based on expected compression ratio for the data in the extent, in accordance with certain embodiments.

If the expected compression ratio is 1:1 or the data is encrypted then the score is increased by 50 (as shown via reference numerals 502, 504).

If the expected compression ratio is over 1:1 then the score is decreased up to 50 based on the compression ratio. In certain embodiments the amount to subtract for decreasing the score is (Compression Ratio−1) multiplied by 50. Therefore, for compression at 1.5:1, the score will be decreased by 25. For over 2 times compression, the score will be decreased by 50.

It should be noted that other embodiments may use other numbers for adjustment of the score than those shown in FIG. 5.

Figure 6:
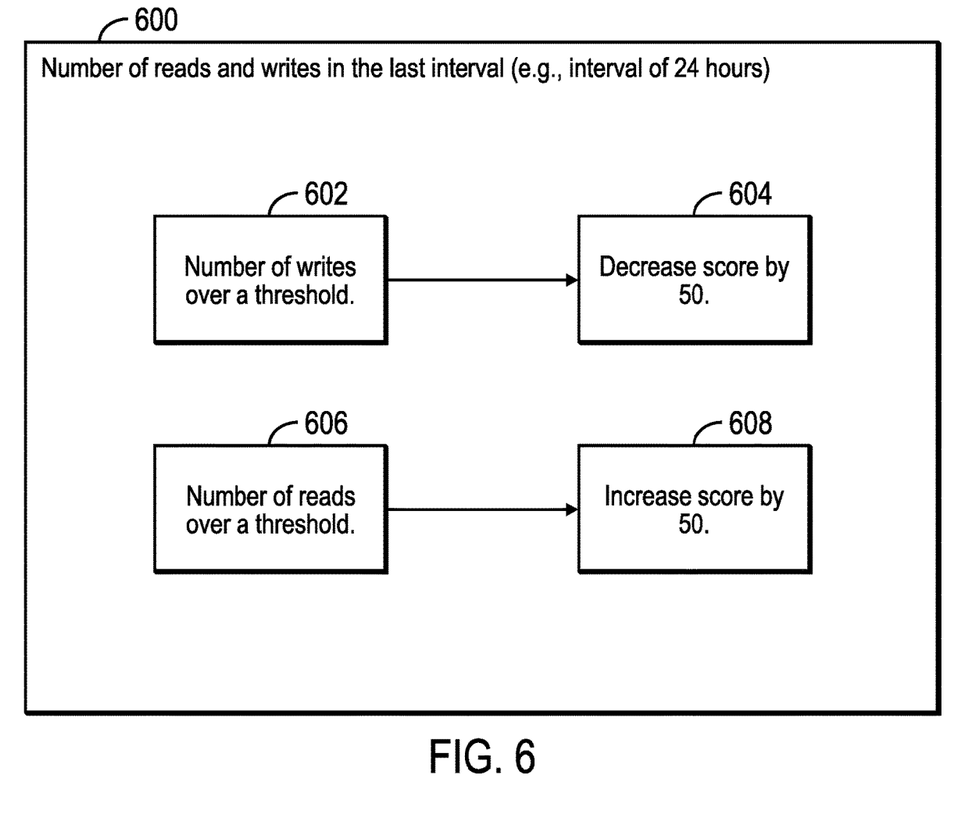
FIG. 6 illustrates a block diagram that shows adjustment of score based on number of reads and writes in the last interval, in accordance with certain embodiments.

FIG. 6 illustrates a block diagram 600 that shows adjustment of score based on number of reads and writes in the last interval, in accordance with certain embodiments.

If the number of writes are over a threshold then the score is decreased by 50 (as shown via reference numeral 602 and 604). If the number of reads are over a threshold then the score is increased by 50 (as shown via reference numerals 606, 608). The number 50 used in FIG. 6 may be different in other embodiments.

Figure 7:
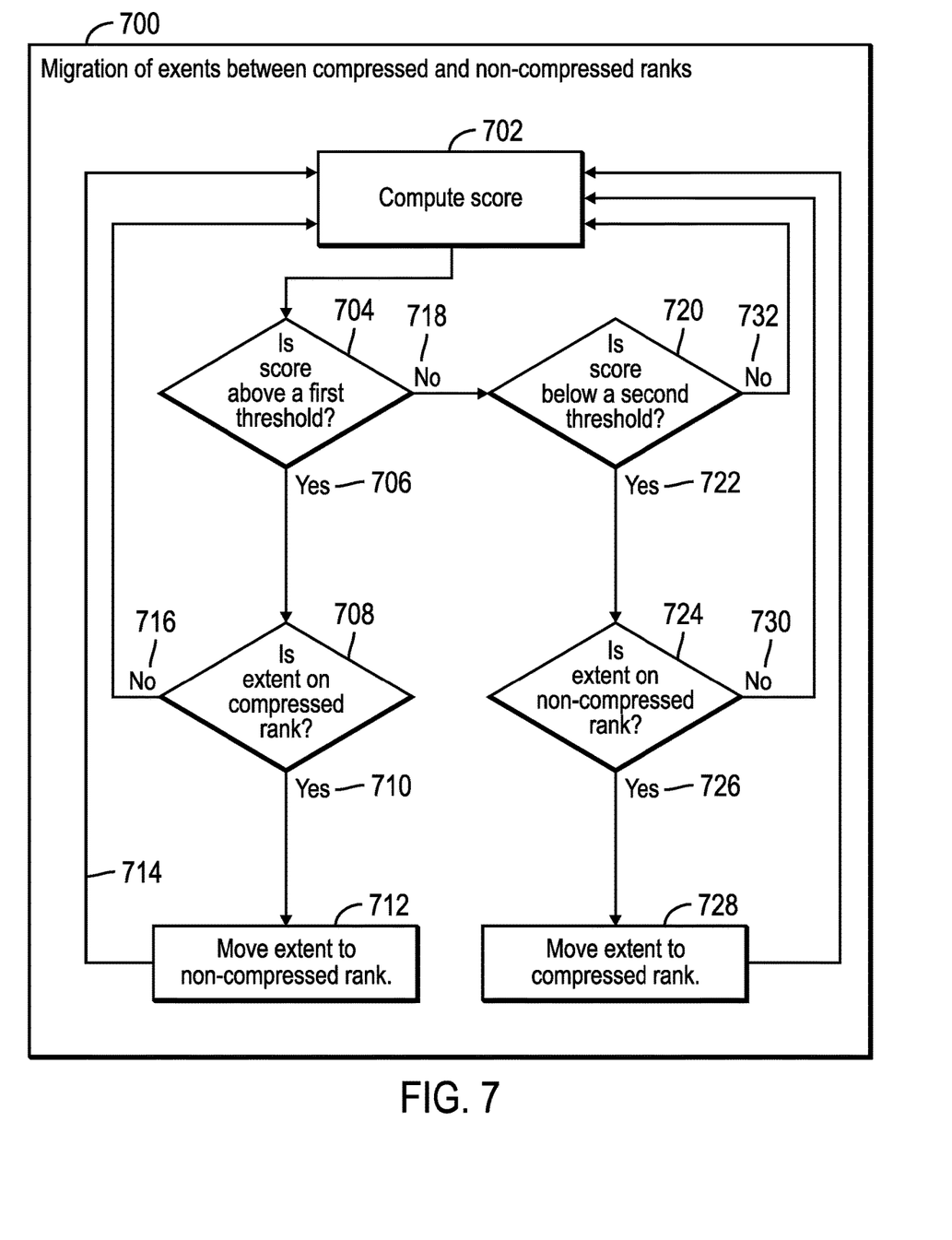
FIG. 7 illustrates a flowchart that shows migration of extents between compressed and non-compressed ranks, in accordance with certain embodiments.

FIG. 7 illustrates a flowchart 700 that shows migration of extents between compressed and non-compressed ranks, in accordance with certain embodiments.

FIG. 7 shows certain embodiments in which based on the score the process moves extents between compressed and non-compressed drives as follows:

If score is over a threshold (e.g., 75) and the extent is on compressed rank then move the extent to non-compressed rank; and If the score is below a threshold (e.g., 25) and the extent is non-compressed rank then move the extent to compressed rank.

The process starts at block 702 that shows the computation of the score. Control proceeds to block 704 where a determination is made as to whether the score is above a first threshold (e.g., 75). If so (reference numeral 706), a determination is made as to whether the extent is on a compressed rank (at block 708). If the extent is on a compressed rank ("Yes" branch 710) then the extent is moved to a non-compressed rank (at block 712). Control may return for further computation of the score, as shown via reference numeral 714 and the "No" branch 716 from block 708.

If the score is not above the first threshold ("No" branch 718) then a determination is made as to whether the score is below a second threshold (e.g., 25) [as shown via reference numeral 720]. If so, and the extent is on a non-compressed rank then the extent is moved to a compressed rank (as shown via reference numerals 722, 724, 726, 728). Control may return to block 702 from blocks 728, 724 ("No branch 730), 720 ("No" branch 732).

Figure 8:
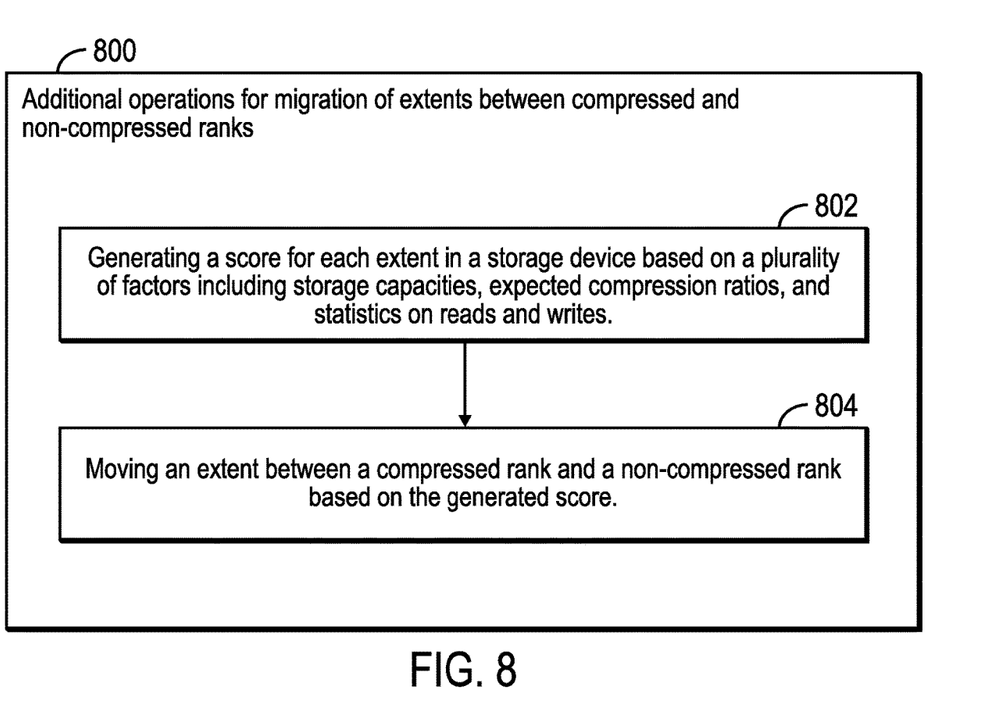
FIG. 8 illustrates a flowchart that shows additional operations for migration of extents between compressed and non-compressed ranks, in accordance with certain embodiments.

FIG. 8 illustrates a flowchart 800 that shows additional operations for migration of extents between compressed and non-compressed ranks, in accordance with certain embodiments. The operations shown in FIG. 8 may be performed by the data migration application 108 that executes in the storage controller 102.

Control starts at block 802 in which a score is generated for each extent in a storage device based on a plurality of factors including storage capacities, expected compression ratios, and statistics on reads and writes. An extent is moved (at block 804) between a compressed rank and a non-compressed rank based on the generated score.

Therefore, FIGS. 1-8 illustrate certain embodiments for the migration of data between compressed and non-compressed ranks. In certain embodiments, extents are sorted based on a score and those extents with lowest and highest scores are migrated before extents with scores that fall in between the lowest and the highest scores, and the extents with scores between the lowest and the highest scores may change in the future.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 9:
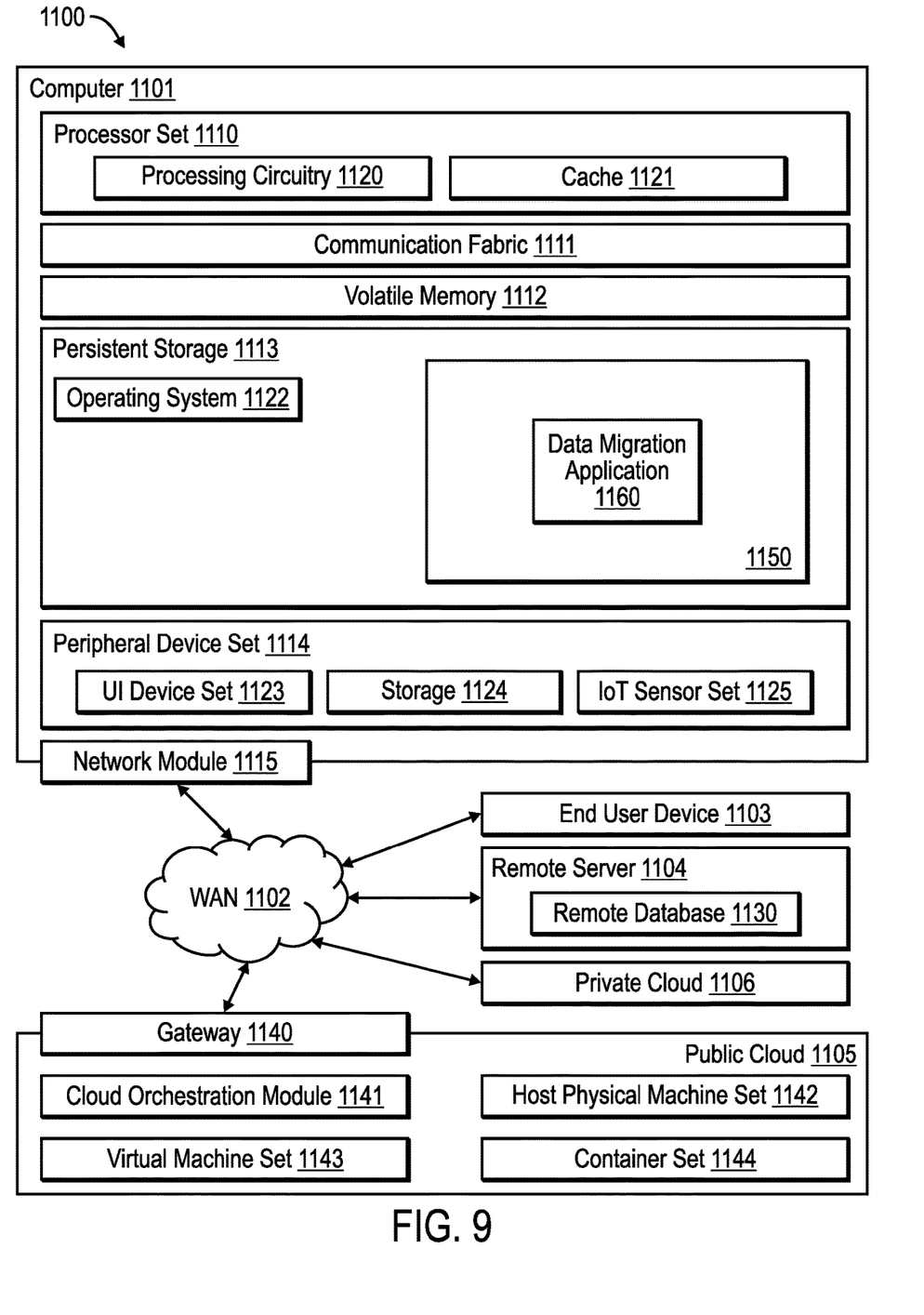
FIG. 9 illustrates a computing environment in which certain components may be implemented, in accordance with certain embodiments.

In FIG. 9 computing environment 1100 contains an example of an environment for the execution of at least some of the computer code (block 1150) involved in performing the operations of a data migration application 1160 that may perform operations shown in FIGS. 1-8.

In addition to block 1150, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1150, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible computer 1101 may be located in a cloud, even though it is not shown in a cloud in FIG. 8. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1150 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of nonvolatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid-state storage devices. Operating system 1122 may take several forms, such as various known proprietary operating systems or open-source Portable Operating System Interface-type operating systems that employ a kernel. The code included in block 1150 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. I/O T sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
generating a score for each extent in a storage device based on a plurality of factors including storage capacities, expected compression ratios, and statistics on reads and writes; and
moving an extent between a compressed rank and a non-compressed rank based on the generated score by performing:
in response to determining that the score is above a first predetermined threshold, and the extent is on the compressed rank, moving the extent to the non-compressed rank;
in response to determining that the score is not above the first predetermined threshold, and the extent is below a second predetermined threshold, and the extent is on the non-compressed rank, moving the extent to the compressed rank;
in response to determining that the score is above the first predetermined threshold, and the extent is not on the compressed rank, recomputing the score;
in response to determining that the score is not above the first predetermined threshold, and the extent is not below the second predetermined threshold, recomputing the score; and
in response to determining that the score is not above the first predetermined threshold, and the extent is below the second predetermined threshold, and the extent is not on the non-compressed rank, recomputing the score.

2. The method of claim 1, wherein the plurality of factors for generating the score comprise:
storage capacity remaining in compressed ranks;
storage capacity remaining in non-compressed ranks;
an expected compression ratio for data in the extent; and
a number of reads and writes in a predetermined time interval.

3. The method of claim 1, wherein if a free storage capacity in the compressed rank is below a predetermined percentage then increasing the score, and wherein if the free storage capacity in the non-compressed rank is below the predetermined percentage then decreasing the score.

4. The method of claim 1, wherein extents are sorted based on the score and those extents with lowest and highest scores are migrated before extents with scores that fall in between the lowest and the highest scores.

5. The method of claim 1, wherein if a number of writes in a previous time interval is over a third predetermined threshold then decreasing the score, and wherein if a number of reads in the previous time interval is over the third predetermined threshold then increasing the score.

6. A system, comprising:
a memory; and
a processor coupled to the memory, wherein the processor performs operations, the operations comprising:
generating a score for each extent in a storage device based on a plurality of factors including storage capacities, expected compression ratios, and statistics on reads and writes; and
moving an extent between a compressed rank and a non-compressed rank based on the generated score by performing:
in response to determining that the score is above a first predetermined threshold, and the extent is on the compressed rank, moving the extent to the non-compressed rank;
in response to determining that the score is not above the first predetermined threshold, and the extent is below a second predetermined threshold, and the extent is on the non-compressed rank, moving the extent to the compressed rank;
in response to determining that the score is above the first predetermined threshold, and the extent is not on the compressed rank, recomputing the score;
in response to determining that the score is not above the first predetermined threshold, and the extent is not below the second predetermined threshold, recomputing the score; and
in response to determining that the score is not above the first predetermined threshold, and the extent is below the second predetermined threshold, and the extent is not on the non-compressed rank, recomputing the score.

7. The system of claim 6, wherein the plurality of factors for generating the score comprise:
storage capacity remaining in compressed ranks;
storage capacity remaining in non-compressed ranks;
an expected compression ratio for data in the extent; and
a number of reads and writes in a predetermined time interval.

8. The system of claim 6, wherein if a free storage capacity in the compressed rank is below a predetermined percentage then increasing the score, and wherein if the free storage capacity in the non-compressed rank is below the predetermined percentage then decreasing the score.

9. The system of claim 6, wherein extents are sorted based on the score and those extents with lowest and highest scores are migrated before extents with scores that fall in between the lowest and the highest scores.

10. The system of claim 6, wherein if a number of writes in a previous time interval is over a third predetermined threshold then decreasing the score, and wherein if a number of reads in the previous time interval is over the third predetermined threshold then increasing the score.

11. A computer program product, the computer program product comprising a computer readable storage medium having computer readable program code embodied therewith, the computer readable program code when executed is configured to perform operations, the operations comprising:
generating a score for each extent in a storage device based on a plurality of factors including storage capacities, expected compression ratios, and statistics on reads and writes; and
moving an extent between a compressed rank and a non-compressed rank based on the generated score by performing:
in response to determining that the score is above a first predetermined threshold, and the extent is on the compressed rank, moving the extent to the non-compressed rank;
in response to determining that the score is not above the first predetermined threshold, and the extent is below a second predetermined threshold, and the extent is on the non-compressed rank, moving the extent to the compressed rank;
in response to determining that the score is above the first predetermined threshold, and the extent is not on the compressed rank, recomputing the score;

in response to determining that the score is not above the first predetermined threshold, and the extent is not below the second predetermined threshold, recomputing the score; and in response to determining that the score is not above the first predetermined threshold, and the extent is below the second predetermined threshold, and the extent is not on the non-compressed rank, recomputing the score.

12. The computer program product of claim 11, wherein the plurality of factors for generating the score comprise:
storage capacity remaining in compressed ranks;
storage capacity remaining in non-compressed ranks;
an expected compression ratio for data in the extent; and
a number of reads and writes in a predetermined time interval.

13. The computer program product of claim 11, wherein if a free storage capacity in the compressed rank is below a predetermined percentage then increasing the score, and wherein if the free storage capacity in the non-compressed rank is below the predetermined percentage then decreasing the score.

14. The computer program product of claim 11, wherein extents are sorted based on the score and those extents with lowest and highest scores are migrated before extents with scores that fall in between the lowest and the highest scores.

* * * * *